United States Patent
Munson (10) Patent No.: US 7,905,495 B2
(45) Date of Patent: Mar. 15, 2011

(54) CIRCUMFERENTIAL SEALING ARRANGEMENT

(75) Inventor: John Munson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 532 days.

(21) Appl. No.: 11/946,930

(22) Filed: Nov. 29, 2007

(65) Prior Publication Data

US 2009/0142180 A1     Jun. 4, 2009

(51) Int. Cl.
*F16J 15/34* (2006.01)
*F04D 29/08* (2006.01)
*F04D 29/10* (2006.01)

(52) U.S. Cl. ........ 277/413; 277/405; 277/390; 277/578; 277/581; 415/173.3; 415/174.3; 415/113; 415/231

(58) Field of Classification Search .................. 277/413, 277/405, 390, 578, 581; 415/231, 173.3, 415/174.3, 113, 174.2
See application file for complete search history.

(56) References Cited

U.S. PATENT DOCUMENTS

| | | | | |
|---|---|---|---|---|
| 2,890,069 A | * | 6/1959 | Larkin et al. ................ | 277/399 |
| 2,937,039 A | | 5/1960 | Santapa | |
| 2,956,824 A | * | 10/1960 | Kuchler et al. ............... | 277/500 |
| 3,285,614 A | | 11/1966 | McClenathan | |
| 3,333,856 A | * | 8/1967 | Voitik ........................... | 277/348 |
| 3,468,527 A | | 9/1969 | Mather | |
| 3,502,343 A | | 3/1970 | Pustelnik | |
| 3,652,183 A | | 3/1972 | Pottharst, Jr. | |
| 3,770,181 A | | 11/1973 | Stahl | |
| 3,797,899 A | | 3/1974 | Anderson | |
| 3,822,066 A | | 7/1974 | Keys | |
| 3,895,811 A | | 7/1975 | Richard, Jr. et al. | |
| 3,907,308 A | | 9/1975 | Stock | |

(Continued)

FOREIGN PATENT DOCUMENTS

DE         3925403 A1     1/1991

(Continued)

OTHER PUBLICATIONS

Patrick Dunlap, Jr., Bruce Steinetz, Jeffrey Demange, High Temperature Propulsion System Structural Seals For Future Space Launch Vehicles, NASA/CP—2004212963/vol. 1, 16 pages.*

(Continued)

*Primary Examiner* — Alison K Pickard
(74) *Attorney, Agent, or Firm* — Ray Meiers; Meiers Law Office LLC (57) ABSTRACT

A circumferential sealing arrangement is disclosed herein. The circumferential sealing arrangement includes a structure operable to rotate about an axis and having a first surface facing radially outward. The circumferential sealing arrangement also includes a static housing circumscribing the rotatable structure. The circumferential sealing arrangement also includes at least one seal element connected to the static housing and having a second surface facing radially inward. The circumferential sealing arrangement also includes a seal runner rotatable with the structure and having a third surface facing radially outward. The third surface cooperates with the second surface to form a circumferential seal between the static housing and the rotatable structure. A radial gap is defined between the first surface of the rotatable structure and a fourth surface of the seal runner facing radially inward and opposing the first surface. The circumferential sealing arrangement also includes at least one resilient member disposed in the radial gap and operable to radially compress in response to a change in size of the radial gap to limit hoop stresses being generated in the seal runner.

23 Claims, 6 Drawing Sheets

U.S. PATENT DOCUMENTS

| | | | |
|---|---|---|---|
| 3,926,443 A | 12/1975 | Fenerty et al. | |
| 4,036,505 A | 7/1977 | Floyd et al. | |
| 4,174,844 A | 11/1979 | Zobens | |
| 4,196,912 A | 4/1980 | Quitberg | |
| 4,212,473 A | 7/1980 | Arai | |
| 4,243,233 A | 1/1981 | Arai | |
| 4,279,424 A | 7/1981 | Zerlauth | |
| 4,323,255 A | 4/1982 | Wiese | |
| 4,336,944 A | 6/1982 | Blair | |
| 4,398,866 A * | 8/1983 | Hartel et al. | 415/180 |
| 4,415,165 A | 11/1983 | Martini | |
| 4,484,752 A | 11/1984 | Bentley | |
| 4,515,377 A | 5/1985 | Johnson | |
| 4,543,038 A * | 9/1985 | Kitaguchi | 415/112 |
| 4,659,092 A | 4/1987 | Wallace et al. | |
| 4,759,554 A | 7/1988 | Kemp et al. | |
| 4,836,559 A | 6/1989 | Bihlmaier | |
| 4,897,021 A * | 1/1990 | Chaplin et al. | 415/173.7 |
| 4,969,652 A * | 11/1990 | Munson | 277/543 |
| 4,973,065 A | 11/1990 | Habich | |
| 4,998,739 A | 3/1991 | Weiler | |
| 5,014,999 A | 5/1991 | Makhobey | |
| 5,017,022 A | 5/1991 | Ruggles et al. | |
| 5,039,113 A * | 8/1991 | Gardner | 277/379 |
| 5,133,562 A | 7/1992 | Lipschitz | |
| 5,183,270 A | 2/1993 | Alten et al. | |
| 5,263,724 A | 11/1993 | Hansen et al. | |
| 5,301,957 A * | 4/1994 | Hwang et al. | 277/350 |
| 5,344,161 A * | 9/1994 | Sandgren | 277/360 |
| 5,533,739 A | 7/1996 | Sedy | |
| 5,538,257 A * | 7/1996 | Sandgren | 277/379 |
| 5,593,165 A * | 1/1997 | Murray et al. | 277/543 |
| 5,626,347 A | 5/1997 | Ullah | |
| 5,813,830 A * | 9/1998 | Smith et al. | 415/170.1 |
| 6,132,168 A * | 10/2000 | Kovaleski et al. | 415/113 |
| 6,224,322 B1 * | 5/2001 | Calboreanu | 415/34 |
| 6,322,081 B1 * | 11/2001 | Ullah et al. | 277/504 |
| 6,655,695 B1 | 12/2003 | Sund et al. | |
| 6,666,460 B2 * | 12/2003 | Diana | 277/608 |
| 6,918,594 B2 | 7/2005 | Sund et al. | |
| 7,134,667 B2 * | 11/2006 | Weiler | 277/424 |
| 7,175,388 B2 * | 2/2007 | Labbe et al. | 415/174.5 |
| 7,648,143 B2 * | 1/2010 | Davis et al. | 277/349 |
| 7,726,940 B2 * | 6/2010 | Snowsill | 415/231 |
| 2009/0087307 A1 * | 4/2009 | Takeuchi et al. | 415/174.2 |

FOREIGN PATENT DOCUMENTS

EP      0571791 A1      12/1993

OTHER PUBLICATIONS

Jay Oswald, Robert Mullen, Patrick Dunlap, Jr., Bruce Steintz, Modeling and Evaluation of Canted Coil Springs as High Temperature Seal Preloading Devices, NASA/TM—2004-213189, Sep. 2004, 18 pages.*

Jay Oswald, Robert Mullen, Patrick Sunlap, Jr., Bruce Steintz, Modeling of Canted Coil Springs and Knitted Spring Tubes as High Temperature Seal Preload Devices, AIAA 2005-4156, 1 page.*

* cited by examiner

CIRCUMFERENTIAL SEALING ARRANGEMENT

BACKGROUND OF THE INVENTION

1. Field of the Invention

The invention relates to a circumferential seal with a static portion and a rotating portion and more specifically to a support arrangement for the rotating portion of the circumferential sealing arrangement.

2. Description of Related Prior Art

Circumferential seals can be used in operating environments in which one component is rotating and a second component is stationary. The circumferential seal can prevent leakage of fluid along the axis of rotation, especially where the rotating component passes through a wall or partition. The rotating component is usually called a seal runner and the non-rotating or static component can be referred to as a housing or seal stator. A seal element is usually connected to the housing or stator and contacts the seal runner to form the seal. The seal runner can be made of metal or other materials and can be mounted to a rotating structure, such as a shaft. The seal runner can have a surface facing radially outward for sealing. The seal element can include a sealing surface that faces radially-inward. The two surfaces cooperate to seal a leakage path between rotating components and static components. A small radial gap can be maintained between the sealing element and the seal runner under some operating conditions to allow for an insignificant amount of leakage across the seal and prevent damage to the seal element.

SUMMARY OF THE INVENTION

In summary, the invention is a circumferential sealing arrangement. The circumferential sealing arrangement includes a structure operable to rotate about an axis and having a first surface facing radially outward. The circumferential sealing arrangement also includes a static housing circumscribing the rotatable structure. The circumferential sealing arrangement also includes at least one seal element connected to the static housing and having a second surface facing radially inward. The circumferential sealing arrangement also includes a seal runner rotatable with the structure and having a third surface facing radially outward. The third surface cooperates with the second surface to form a circumferential seal between the static housing and the rotatable structure. A radial gap is defined between the first surface of the rotatable structure and a fourth surface of the seal runner facing radially inward and opposing the first surface. The circumferential sealing arrangement also includes at least one resilient member disposed in the radial gap and operable to radially compress in response to a change in size of the radial gap to limit hoop stresses being generated in the seal runner.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENT

A plurality of different embodiments of the invention are shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if the a particular feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

In some circumferential seals, a seal runner is operably associated with a rotating structure that is formed from a different material. As a result, the seal runner and the rotating structure may have different coefficients of thermal expansion. Under some operating conditions, the rotating structure may radially expand and contract more rapidly than the seal runner in response to temperature change.

Generally, the seal runner remains centered on the rotating structure and the position of the seal runner relative to the rotating structure is usually tightly controlled. Relatively rapid expansion of the rotating structure could therefore result in relatively rapid expansion of the seal runner and the generation of hoop stresses in the seal runner. In other words, the seal runner could be mechanically forced to radially expand, rather than allowed to otherwise expand gradually in response to temperature change. If the seal runner is formed from a relatively hard material, it can be desirable to radially support the seal runner in a manner that maintains its position relative to the rotating structure, but accommodates relative size changes of the underlying rotating structure.

Figure 1:
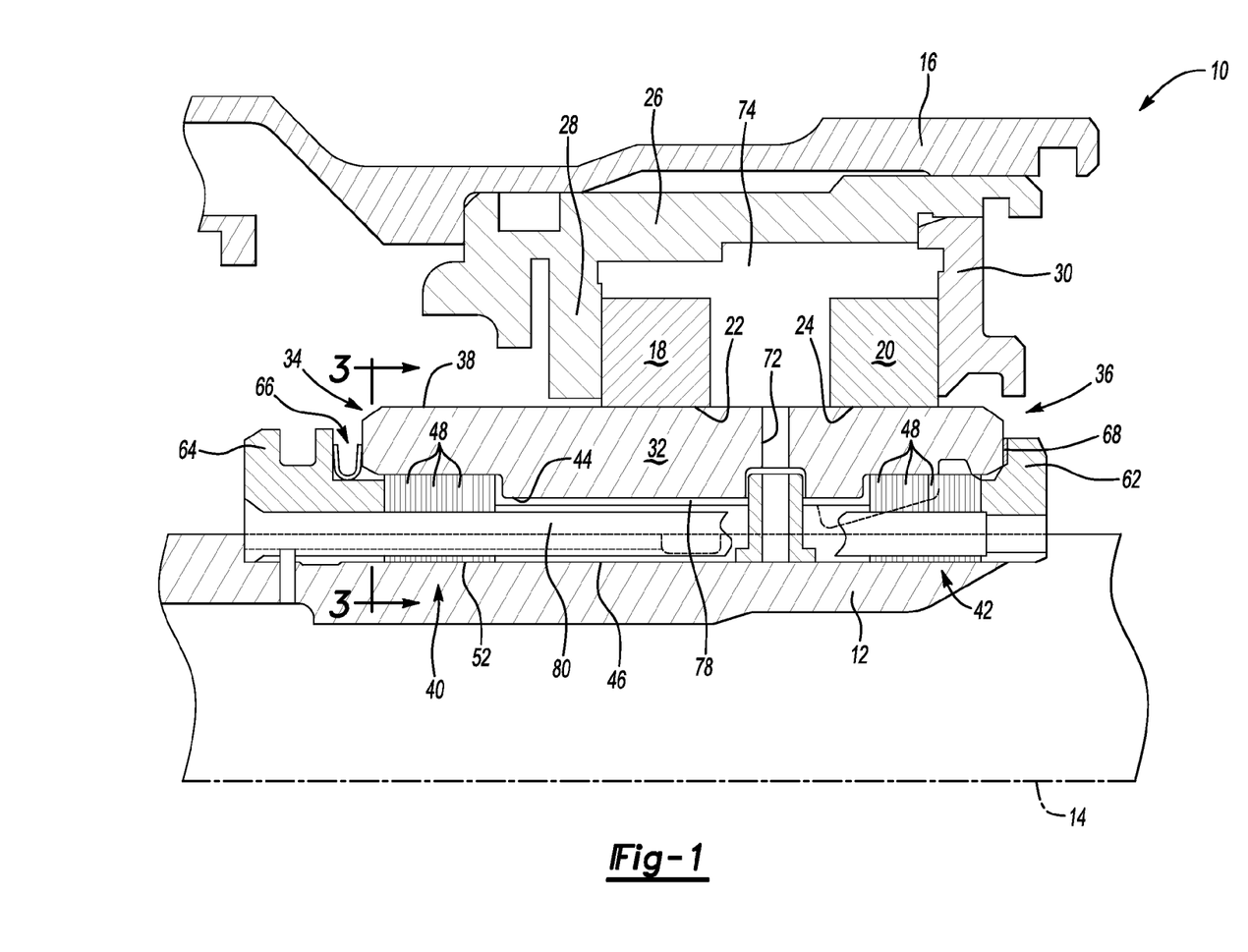
FIG. 1 is a cross-sectional view of a first exemplary embodiment of the invention.

A first exemplary embodiment of the invention for radially supporting a seal runner in a circumferential seal arrangement is shown in FIG. 1. A portion of a turbine engine 10 is shown in FIG. 1. The turbine engine 10 includes a structure 12 disposed for rotation about an axis 14. The structure 12 can be a shaft or any other structure operable to rotate. The structure 12 is formed from a material such as steel having a first coefficient of thermal of expansion. The turbine engine 10 also includes a housing 16 circumscribing the structure 12.

The circumferential sealing arrangement of the first exemplary embodiment of the invention is operable to define a seal between the moving portion of the turbine 10, including the structure 12 and any associated rotatable structure, and the static portion of the turbine 10, including the housing 16 and any associated substantially non-moving structure. Two static seal elements 18, are connected to the housing 16 through a stator 26. The seal elements 18, 20 can be formed from carbon or any other material or composition desired. Each of the seal elements 18, 20 and the corresponding static structure has a cumulative second coefficient of thermal expansion that can be different than the first coefficient of thermal expansion. Each of the seal elements 18, 20 has a respective radially inward surface 22, 24 facing toward the structure 12. The seal elements 18, 20 are spaced from one another along the axis 14 and positioned between a flange 28 of the stator 26 and a locking ring 30.

The turbine engine 10 also includes a seal runner 32 encircling and radially spaced from the structure 12 such that a radial gap 78 is defined between the seal runner 32 and the structure 12. The seal runner 32 rotates with the structure 12 in operation. The exemplary seal runner 32 is ceramic but may be formed from other materials in alternative embodiments of the invention. The seal runner 32 is operable to cooperate with the seal elements 18, 20 to define a circumferential seal between the housing 16 and the structure 12. The seal runner 32 extends along the axis 14 between first and second ends 34, 36 and includes a radially outer surface 38 operable to contact and/or substantially contact the respective radially inner surfaces 22, 24 of the seal elements 18, 20 to thereby seal the structure 12 and the housing 16 relative to one another. The seal runner 32 has a third coefficient of thermal expansion different than the first coefficient of thermal expansion. Thus, the seal runner 32 will expand and contract at a different rate than the structure 12 in response to changes in temperature.

Each of the sealing elements 18, 20 can be carbon and/or carbon-based and be composed of separate segments with overlapping joints at the ends. The sealing elements 18, 20 can also be formed from other materials, such as ceramics. This arrangement allows the sealing elements 18, 20 to expand or contract in response to differential thermal growth of the seal runner 32 relative to the sealing elements 18, 20 and also compensates for wear. Alternatively, one or both of the sealing elements 18, 20 can be made with no joints or with the joints fully collapsed at cold build assembly. In either of the latter two cases, the sealing elements 18, 20 will run in intimate contact with the seal runner 32 at a relatively high temperature condition; this produces the largest differential thermal growth. The seal assembly can run with a clearance between the seal elements 18, 20 and the seal runner 32 at other temperatures.

As set forth above, the exemplary seal runner 32 is ceramic, may be formed from other materials in other embodiments of the invention. Metal may be used to form the seal runner. However, structural properties of the metal seal runners can degrade with increasing temperature. Due to the exposure to air at elevated temperatures and the seal heat generation, it can be necessary to provide cooling oil to the seal runner to remove heat. One characteristic of ceramic materials is that they tend to retain their structural properties at very high temperatures. This makes it unnecessary to cool the seal runner, thus removing that quantity of oil from the sump. This is also desirable as it reduces the size of the lubrication system. Also, it has been found that carbon seal elements can be abrasive. As a result, metal seal runners are often coated with friction resistant material. Ceramic materials, on the other hand, are relatively hard and a separate coating is not often required. Another desirable characteristic of most ceramic materials is their low coefficient of thermal expansion. However, it is recognized that in some operating environments metal may be a more desirable choice of material for the seal runner and the invention contemplates such embodiments.

The turbine engine 10 also includes first and second resilient members 40, 42 disposed in the radial gap 78 defined between a radially inner surface 44 of the ceramic seal runner 32 and a radially outer surface 46 of the structure 12. The resilient members 40, 42 are operable to radially compress in response to a change in a size of the radial gap 78 to limit hoop stresses being generated in the ceramic seal runner 32. The size of the radial gap 78 can change when the size of the structure 12 increases or decreases more rapidly than the size of the seal runner 32. The changes in size can occur in response to changes in temperature. The resilient members 40, 42 allow the seal runner 32 to remain centered on the axis 14, but spare the seal runner 32 from being mechanically forced to change size. The seal runner 32 is substantially free to gradually change size in response to changes in temperature.

In the first exemplary embodiment of the invention, each of the first and second resilient members 40, 42 includes a plurality of similarly-formed plates 48. Each plate 48 includes a radially inner surface 52. The surface 52 of the plate 48 is sized to correspond to the radial size of the surface 46 of the structure 12 such that plate 48 tightly encircles the structure 12. FIG. 1 shows that each of the resilient members 40, 42 includes a plurality of the plates 48, each plate 48 having the same thickness and stacked together along the axis 14. FIG. 1 also shows that each of the resilient members 40, 42 is formed by a stack of the same number of plates 48. The first and second plurality of plates 48 are disposed on opposite sides of the seals 18, 20 along the axis 14 so that the seal runner 32 is not cantilevered, reducing the likelihood of bending stresses in the seal runner 32. A cylindrical spacer 80 can be disposed between the stacks of plates 48 of the first and second resilient members 40, 42.

Figure 2:
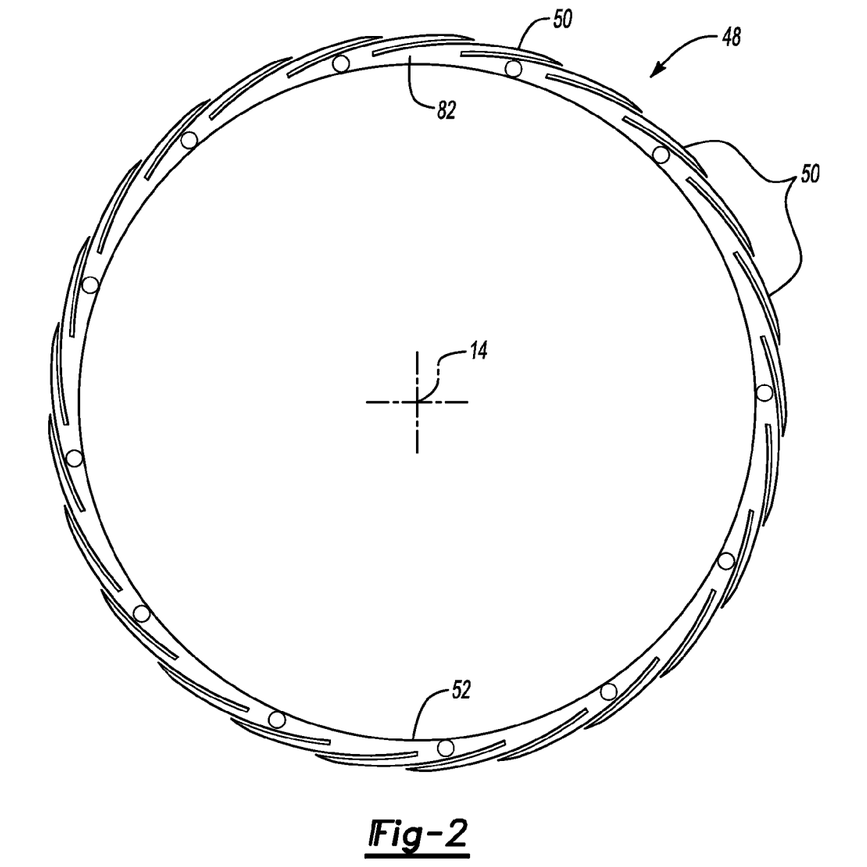
FIG. 2 is a plan view of a plate of a resilient member according to the first exemplary embodiment of the invention.
Figure 3:
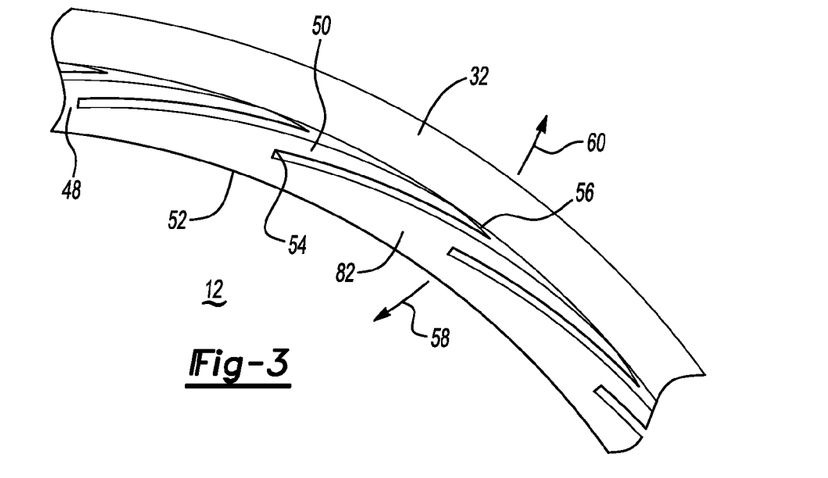
FIG. 3 is a partial cross-sectional view of the first exemplary embodiment of the invention taken along section lines 3-3 in FIG. 1.

FIGS. 2 and 3 show that each plate 48 is formed with a disc portion 82 and plurality of fingers 50, each projecting at least partially radially away from the disc portion 82. The exemplary fingers 50 also extend at least partially circumferentially relative to the disc portion 82. Each finger 50 extends cantilevered from a base 54 to a distal end 56. The distal end 56 can pivot relative to the base 54 in a direction represented by arrow 58 in response to a reduction in the size of the radial gap 78 between the seal runner 32 and the structure 12. Thus, the deflection of the finger 50 from a static condition increases and the plate 48 is radially compressed as a result of narrowing of the radial gap 78. The distal end 56 can pivot relative to the base 54 in a direction represented by arrow 60 in response to an increase in the size of the radial gap 78 between the seal runner 32 and the structure 12. Thus, the deflection of the finger 50 decreases and the plate 48 is less radially compressed as a result of an expansion of the radial gap 78. Deflection of the fingers 50 substantially decreases the hoop stresses generated in the seal runner 32 as a result of radial expansion of the structure 12 relative to the seal runner 32. The fingers 50 are mechanically deflected rather than the seal runner being mechanically enlarged. In addition, the deflection of the fingers 50 enhances control over the gap between the seal elements 18, 20 and the outer surface 38 of the seal runner 32; the seal runner 32 is less likely to be radially shifted when the structure 12 expands in response to changes in temperature. The plates 48, seal runner 32 and rotating structure 12 can be sized such that the fingers 50 are at least partially deflected at all times.

In alternative embodiments of the invention, only one of the resilient members 40, 42 may include a plurality of plates 48 and the other of the resilient members 40, 42 may be formed differently. Also, in alternative embodiments of the invention, one or both of the resilient members 40, 42 may include only a single plate 48. Furthermore, the stack of plates 48 may include plates of different thicknesses to tune the radial compressibility of the stack. The radial compressibility can also be tuned by changing the number of plates used for either of the resilient members 40, 42. The radial compressibility can also be tuned by changing the number and arrangement of fingers 50.

Referring again to FIG. 1, the first exemplary embodiment of the invention also includes a flange member 62 extending radially-outward away from the structure 12 and disposed adjacent to the second end 36 of the seal runner 32. A locking member 64 is operable to move along the axis 14 for pressing the ceramic seal runner 32 against the flange member 62 and thereby lockup the assembly.

A face seal 66 is disposed axially between the seal runner 32 and the locking member 64 and a washer 68 is disposed axially between the seal runner 32 and the flange member 62. The face seal 66 is an axially compliant member that is operable to deform in response to the relative changes in the length between the seal runner 32 and the rotating structure 12. For example, if the seal runner 32 is clamped initially at cold build to some predetermined axial clamp load, at operating temperature the clamp load can diminish due to the relative thermal expansion. The axially compliant member, i.e. face seal 66, serves a similar purpose as the finger plates 48 but in the axial direction. Also, the face seal 66 provide an air seal as well.

Both the face seal 66 and the washer 68 can seal and reduce radial friction when the shaft 16 and seal runner 32 change radial size relative to one another and thereby move radially relative to one another. The seal runner 32 can be formed with an aperture 72 extending radially. The aperture 72 can be positioned between the seal elements 18, 20 along the axis 14 so that pressurized air can be directed into a chamber 74 defined between the stator 26 and the seal runner 32. The seal elements 18, 20 cooperate with the housing 16 and the seal runner 32 to define the chamber 74 with the locking ring 30 and the stator 26.

Figure 4:
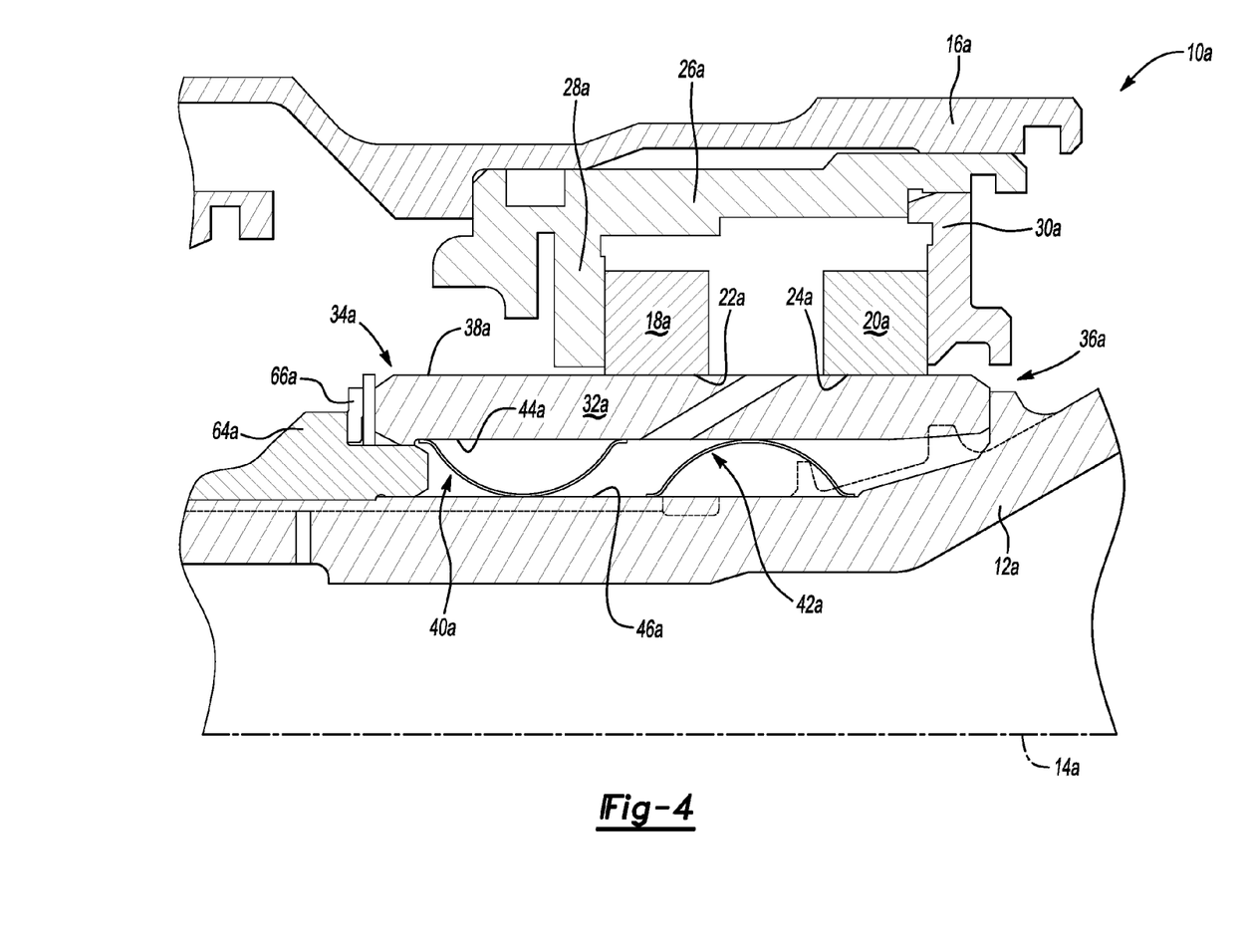
FIG. 4 is a cross-sectional view of a second exemplary embodiment of the invention.
Figure 5:
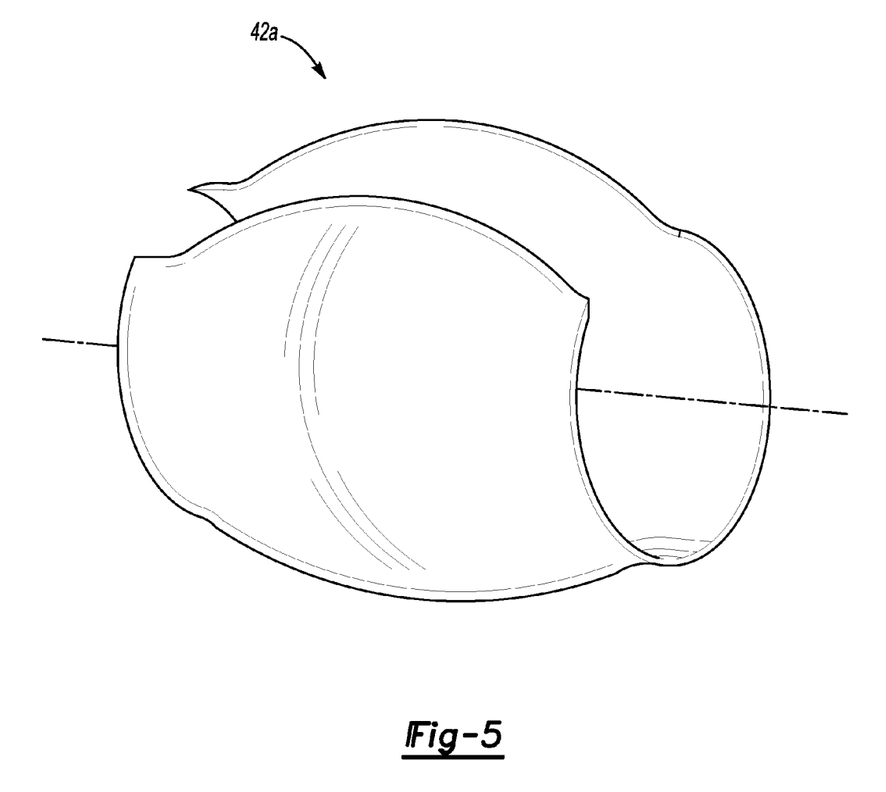
FIG. 5 is a perspective view of a resilient member according to the second exemplary embodiment of the invention with a cut-away to show the cross-section of the resilient member.

FIGS. 4 and 5 show a second embodiment of the invention as part of a turbine engine 10*a*. The turbine engine 10*a* includes a structure 12*a* disposed for rotation about an axis 14*a* and formed from a material having a first coefficient of thermal of expansion. A housing 16*a* circumscribes the structure 12*a* and is substantially stationary relative to the structure 12*a*. Two carbon seals 18*a*, 20*a* are engaged with the housing 16*a* and each has a second coefficient of thermal expansion different than the first coefficient of thermal of expansion. The carbon seals 18*a*, 20*a* have respective radially inward 22*a*, 24*a* directed toward the structure 12*a* and are engaged to the housing 16*a* through a stator 26*a*. The carbon seals 18*a*, 20*a* are spaced from one another along the axis 14*a* and positioned between a flange 28*a* of the stator 26*a* and a snap ring 30*a*.

A seal runner 32*a* encircles and is radially spaced from the structure 12*a*. The seal runner 32*a* cooperates with the carbon seals 18*a*, 20*a* to define a circumferential seal between the housing 16*a* and the structure 12*a*. The seal runner 32*a* extends along the axis 14*a* between first and second ends 34*a*, 36*a* and includes a radially outward surface 38*a* operable to contact and/or substantially contact the respective radially inward surfaces 22*a*, 24*a* of the carbon seals 18*a*, 20*a* to thereby seal the structure 12*a* and the housing 16*a* relative to one another. An axially compliant face seal 66*a* is disposed between the seal runner 32*a* and a locking member 64*a* along the axis 14*a*. The seal runner 32*a* has a third coefficient of thermal of expansion different than the first coefficient of thermal of expansion.

The turbine engine 10*a* also includes first and second resilient members 40*a*, 42*a* disposed in a radial gap defined between an inner surface 44*a* of the seal runner 32*a* and an outer surface 46*a* of the structure 12*a*. The resilient members 40*a*, 42*a* are operable to compress in response to a change in a size of the radial gap to limit hoop stresses being generated in the seal runner 32*a*. The size of the radial gap can change when the size of the structure 12*a* changes more or less rapidly than changes in the size of the seal runner 32*a*.

The second exemplary resilient members 40*a*, 42*a* are further defined as being springs that extend circumferentially around the outer surface 46*a* of the structure 12 and each defines a wave-like cross-section in a plane containing the axis 14. FIG. 5 shows an angular section or portion of the resilient member 40*a*. The wave-like cross-section shown in FIG. 4 extends fully around the axis 14. Each of the resilient members 40*a*, 42*a* is free to expand along the axis 14 in response to a change in the size of the radial gap. The exemplary first and second resilient members 40*a*, 42*a* are inverted with respect to one another such that the first resilient member 40*a* is concave relative to the seal runner 32*a* and the second resilient members 42*a* is concave relative to the structure 12*a*.

The resilient members 40*a*, 42*a* can be tuned to a particular operating environment. For example, the resilient members 40*a*, 42*a* can be formed with a relatively thicker sheet of material to increase the stiffness of the resilient members 40*a*, 42*a*. Also, the radius of the wave portion or arc of the resilient members 40*a*, 42*a* can be selected to increase or decrease stiffness.

The first and second resilient members 40, 42 are operable to seal the seal runner 32 and the structure 12 relative to one another in the radial gap. As a result, additional structure for sealing is not required, such as the washer 68 of the first exemplary embodiment of the invention. The first and second resilient members 40, 42 can be coated with another material to enhance sealing properties.

Figure 6:
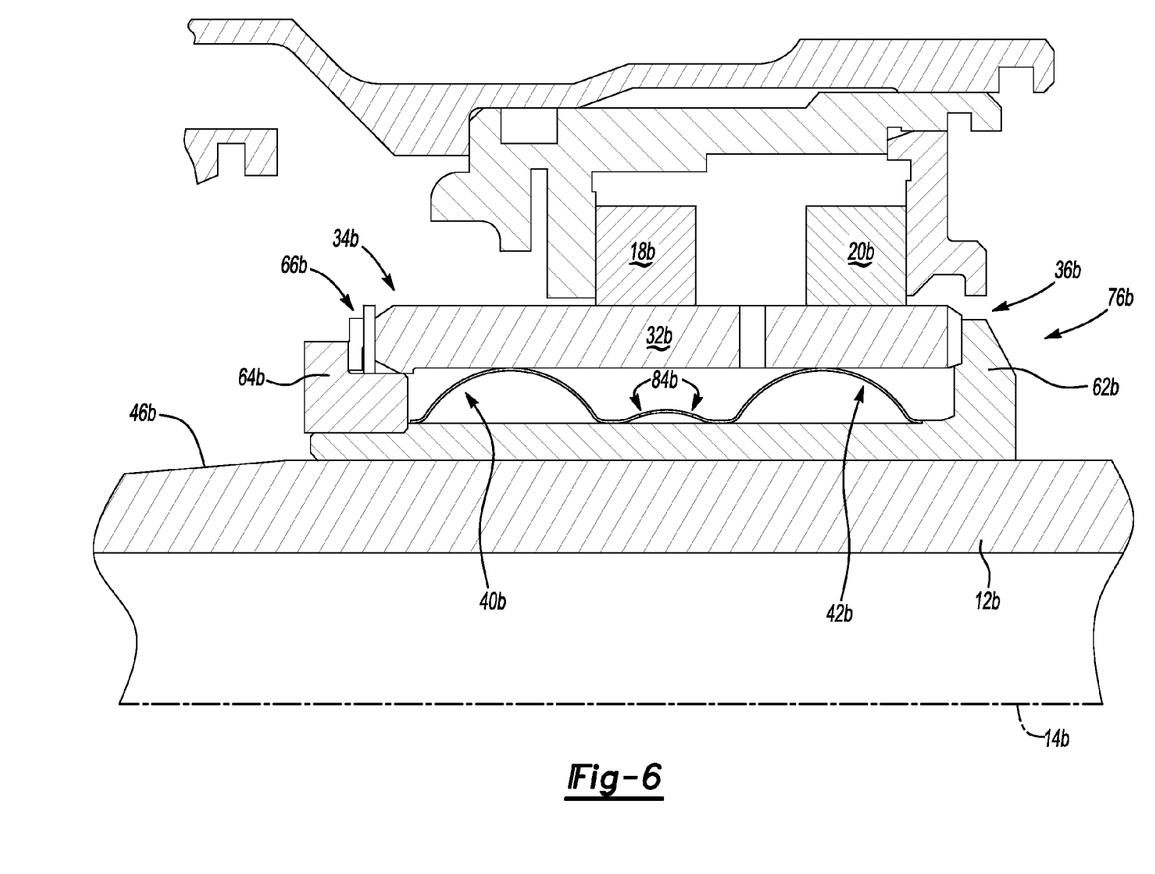
FIG. 6 is a cross-sectional view of a third exemplary embodiment of the invention.
Figure 7:
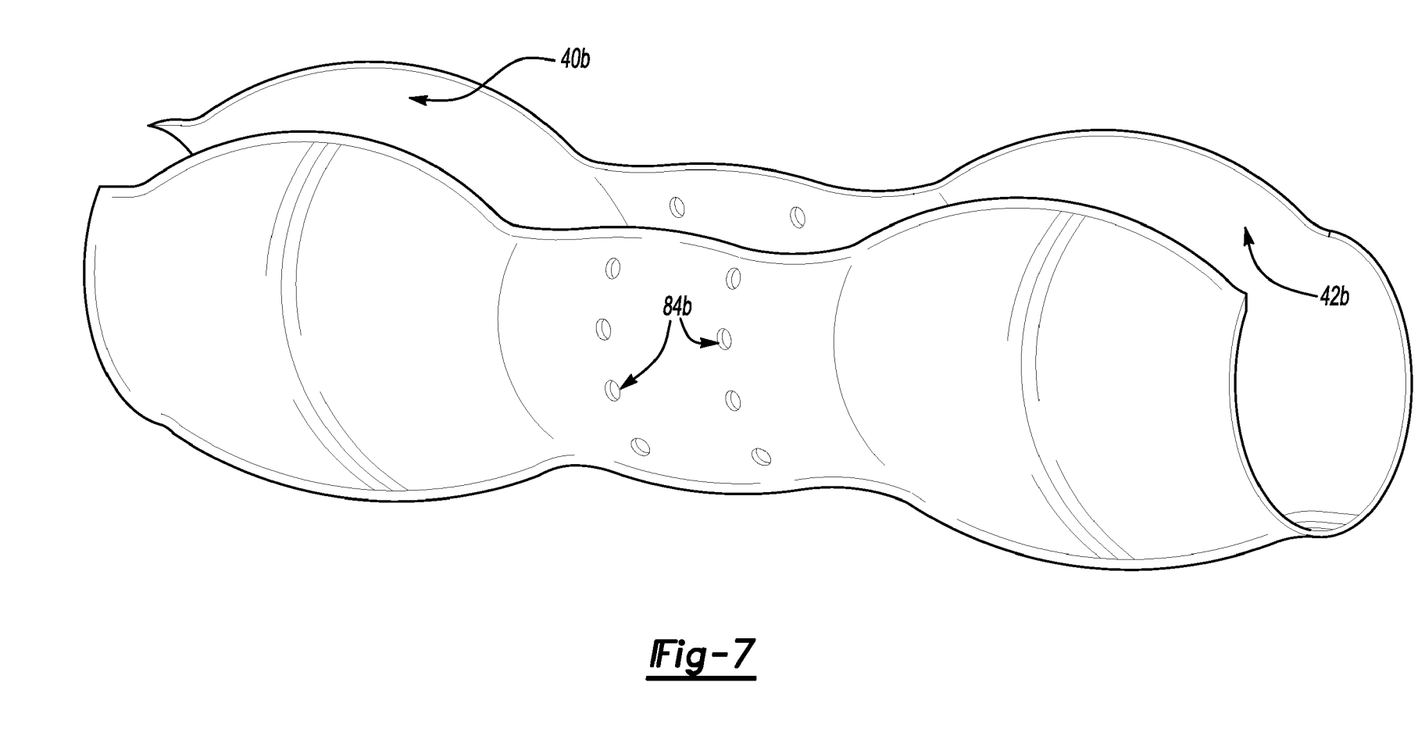
FIG. 7 is a perspective view of a resilient member according to the third exemplary embodiment of the invention with a cut-away to show the cross-section of the resilient member.

FIGS. 6 and 7 shows a third embodiment of the invention similar to the second embodiment of the invention shown in FIGS. 4 and 5. In the third embodiment of the invention, first and second resilient members 40*b*, 42*b* are springs that extend circumferentially around an outer surface 46*b* of a structure 12*b* and defines a wave-like cross-section in a plane containing an axis 14*b*. The first and second resilient members 40*b*, 42*b* are integrally formed and unitary. Also, the first and second resilient members 40*b*, 42*b* are oriented similarly with respect to one another such that the first resilient members 40*b* is concave relative to the structure 12*b* and the second resilient members 42*b* is also concave relative to the structure 12*b*.

In the third exemplary embodiment of the invention, the sealing structure is integrated into a unitized package. A spool member 76*b* is fixed to the structure 12*b* and includes a flange member 62*b*. The flange member 62*b* and an end 36*b* of a seal runner 32*b* are configured to join in a tongue and groove like relationship to permit relative radial movement in response to changes in size. A locking member 64*b* is positioned adjacent to an end 34*b* of the seal runner 32*b* opposite the end 36*b*. A face seal 66*b* is positioned axially between the end 34*b* and the locking member 64*b* to seal and reduce friction between the end 34*b* and the locking member 64*b*. One or more radial through holes 84*b* can be formed in the area where the two resilient members 40*b*, 42*b* so that air can move radially through the resilient members 40*b*, 42*b* to buffer the seal elements 18*b*, 20*b*.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A circumferential sealing arrangement comprising:
   a structure operable to rotate about an axis and having a first surface facing radially outward;
   a static housing circumscribing said structure;
   at least one seal element connected to said static housing and having a second surface facing radially inward;
   a seal runner rotatable with said structure and having a third surface facing radially outward for cooperating with said second surface to form a circumferential seal between said static housing and said structure, wherein a radial gap is defined between said first surface of said structure and a fourth surface of said seal runner facing radially inward and opposing said first surface; and
   at least one resilient member disposed in said radial gap and operable to radially compress in response to a change in size of said radial gap to limit hoop stresses being generated in said seal runner, wherein said at least one resilient member includes at least one plate with a disc portion and a plurality of fingers each projecting at least partially radially from said disc portion such that said plurality of fingers are radially disposed between said disc portion and one of said structure and said static housing along a second axis extending normal to said axis of rotation.

2. The circumferential sealing arrangement of claim 1 wherein said at least one resilient member includes a plurality of said plates stacked together in abutting relation along said axis.

3. The circumferential sealing arrangement of claim 2 wherein all of said plurality of plates have the same thickness.

4. The circumferential sealing arrangement of claim 2 wherein said plurality of plates have different thicknesses.

5. The circumferential sealing arrangement of claim 1 wherein said at least one resilient member is further defined as including first and second resilient members spaced from one another along said axis.

6. The circumferential sealing arrangement of claim 5 wherein both of said first and second resilient members includes a plurality of plates axially stacked together, wherein said first and second resilient members have a different number of plates.

7. The circumferential sealing arrangement of claim 5 further comprising:
   a cylindrical spacer disposed between said first and second resilient members along said axis.

8. The circumferential sealing arrangement of claim 5 wherein both of said first and second resilient members includes a plurality of plates axially stacked together, wherein said first and second resilient members are disposed on opposite sides of said at least seal element along said axis.

9. The circumferential sealing arrangement of claim 8 wherein both of said first and second resilient members includes the same number of said plates axially stacked together.

10. The circumferential sealing arrangement of claim 8 wherein all of said plurality of plates have the same thickness defined along said axis.

11. A circumferential sealing arrangement comprising:
    a structure operable to rotate about an axis and having a first surface facing radially outward;
    a static housing circumscribing said structure;
    at least one seal element connected to said static housing and having a second surface facing radially inward;
    a seal runner rotatable with said structure and having a third surface facing radially outward for cooperating with said second surface to form a circumferential seal between said static housing and said structure, wherein a radial gap is defined between said first surface of said structure and a fourth surface of said seal runner facing radially inward and opposing said first surface; and
    at least one resilient member disposed in said radial gap and operable to radially compress in response to a change in size of said radial gap to limit hoop stresses being generated in said seal runner, wherein said at least one resilient member includes at least one plate with a disc portion and a plurality of fingers, wherein at least one of said plurality of fingers also projects at least partially circumferentially about said disc portion in a plane normal to said axis.

12. The circumferential sealing arrangement of claim 11 wherein said at least one resilient member includes a plurality of said plates arranged along said axis.

13. The circumferential sealing arrangement of claim 12 wherein all of said plurality of plates have the same thickness.

14. The circumferential sealing arrangement of claim 12 wherein said plurality of plates have different thicknesses.

15. The circumferential sealing arrangement of claim 11 wherein said at least one resilient member is further defined as including first and second resilient members spaced from one another along said axis.

16. The circumferential sealing arrangement of claim 15 wherein both of said first and second resilient members includes a plurality of plates axially stacked together, wherein said first and second resilient members are disposed on opposite sides of said at least seal element along said axis.

17. The circumferential sealing arrangement of claim 16 wherein both of said first and second resilient members includes the same number of said plates axially stacked together.

18. The circumferential sealing arrangement of claim 16 wherein all of said plurality of plates have the same thickness defined along said axis.

19. The circumferential sealing arrangement of claim 15 wherein both of said first and second resilient members includes a plurality of plates axially stacked together, wherein said first and second resilient members have a different number of plates.

20. A turbine engine comprising:
    a structure disposed for rotation about an axis and formed from a material having a first coefficient of thermal of expansion;
    a static housing circumscribing said structure;
    first and second carbon seal elements connected to said housing, each having a second coefficient of thermal expansion different than said first coefficient of thermal of expansion and having a radially inward surface directed toward said axis;
    a ceramic seal runner encircling and radially spaced from said structure and operable to cooperate with said first and second carbon seal elements to define a circumferential seal between said static housing and said structure, wherein said ceramic seal runner extends along said axis between first and second ends and includes a radially outward surface directed away from said axis and operable to contact said radially inward surfaces of said first and second carbon seal elements to thereby seal said structure and said static housing relative to one another, and wherein said ceramic seal runner has a third coefficient of thermal of expansion different than said first coefficient of thermal of expansion, and wherein said ceramic seal runner also having an aperture extending radially outward and positioned between said first and second carbon seal elements along said axis for directing pressurized air to a chamber substantially enclosed by said static housing and said first and second carbon seal elements and said ceramic seal runner;

at least one flange member extending radially-outward away from said structure and disposed adjacent to one of said first and second ends of said ceramic seal runner;

a locking member operable to move along said axis for pressing said ceramic seal runner against said at least one flange member and thereby lockup said ceramic seal runner;

at least one face seal disposed axially between said ceramic seal runner and one of said at least one flange member and said locking member and operable to deform in response to the pressing and reduce the likelihood of compressive loading on said ceramic seal runner; and first and second resilient members disposed in a radial gap defined between a radially inner surface of said ceramic seal runner and a radially outer surface of said structure and operable to compress in response to a change in a size of said radial gap to limit hoop stresses being generated in said ceramic seal runner.

21. The turbine engine of claim 20 wherein said first and second resilient members are disposed on opposite of said first and second carbon seal elements along said axis.

22. The turbine engine of claim 20 wherein each of said first and second resilient members includes at least one plate with a disc portion and a plurality of fingers each projecting at least partially radially from said disc portion.

23. The turbine engine of claim 20 wherein each of said first and second resilient members includes a plurality of said plates stacked together in abutting relation along said axis.

\* \* \* \* \*